(12) United States Patent
Lawrence

(10) Patent No.: US 12,590,826 B1
(45) Date of Patent: Mar. 31, 2026

(54) FLOAT INDICATION SEAL

(71) Applicant: Michael Wayne Lawrence, West Chester, OH (US)

(72) Inventor: Michael Wayne Lawrence, West Chester, OH (US)

( * ) Notice: Subject to any disclaimer, the term of this patent is extended or adjusted under 35 U.S.C. 154(b) by 280 days.

(21) Appl. No.: 18/536,381

(22) Filed: Dec. 12, 2023

(51) Int. Cl.
  *G01F 23/34* (2006.01)
  *F16J 15/06* (2006.01)
(52) U.S. Cl.
  CPC .............. *G01F 23/34* (2013.01); *F16J 15/06* (2013.01)
(58) Field of Classification Search
  CPC ................................. G01F 23/34; F16J 15/06
  USPC .......... 73/305–309, 313–314, 317–319, 322, 73/322.5; 277/312, 314, 315, 345, 500, 277/510, 519–521, 527, 585
  See application file for complete search history.

(56) References Cited

U.S. PATENT DOCUMENTS

| | | | |
|---|---|---|---|
| 4,361,039 A | 11/1982 | Lely | |
| 4,483,367 A | 11/1984 | Ross, Jr. | |

| | | | |
|---|---|---|---|
| 6,089,086 A | 7/2000 | Swindler | |
| D537,743 S | 3/2007 | Liu | |
| 7,748,270 B2 | 7/2010 | Mcquaid | |
| 8,434,634 B2 * | 5/2013 | Bork ....................... | G01F 23/50 220/203.02 |
| 8,678,050 B2 | 3/2014 | Dodson | |
| 2004/0079151 A1 * | 4/2004 | Canales ................. | B29C 44/18 73/313 |
| 2016/0123788 A1 * | 5/2016 | Farmanyan ............. | G01F 23/38 73/317 |
| 2016/0209261 A1 | 7/2016 | Lambert | |

FOREIGN PATENT DOCUMENTS

| | | | | |
|---|---|---|---|---|
| CN | 106908102 A | * | 6/2017 | ............. G01F 23/76 |
| CN | 108414056 A | * | 8/2018 | ............. G01F 23/76 |
| WO | 2005022093 | | 3/2005 | |

* cited by examiner

*Primary Examiner* — Robert R Raevis
(74) *Attorney, Agent, or Firm* — Kyle A. Fletcher, Esq.

(57) ABSTRACT

The improved float indication seal includes a float, a float rod, a level indicator, and a wall pass-through. The improved float indication seal may indicate a level of a liquid in a tanker. The float may be located inside of the tanker and may be buoyed by the liquid. The float rod may couple the float to the level indicator located outside of the tanker such that the level indicator may move synchronously with the float to indicate the level of the liquid. The wall pass-through comprising a packing ring may pass the float rod through a tanker wall. A leak at the wall pass-through may be mitigated from outside of the tanker.

15 Claims, 4 Drawing Sheets

FLOAT INDICATION SEAL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of liquid level float gauges and sealing systems, more specifically, an improved float indication seal.

SUMMARY OF INVENTION

The improved float indication seal comprises a float, a float rod, a level indicator, and a wall pass-through. The improved float indication seal may indicate a level of a liquid in a tanker. The float may be located inside of the tanker and may be buoyed by the liquid. The float rod may couple the float to the level indicator located outside of the tanker such that the level indicator may move synchronously with the float to indicate the level of the liquid. The wall pass-through comprising a packing ring may pass the float rod through a tanker wall. A leak at the wall pass-through may be mitigated from outside of the tanker.

An object of the invention is to provide a float inside a tanker to sense the level of a liquid in the tanker and a level indicator on the outside of the tanker to display the level of the liquid.

Another object of the invention is to couple the float to the level indicator using a float rod.

A further object of the invention is to pass the float rod through the tanker wall via a wall pass-through.

Yet another object of the invention is to seal the wall pass-through using a packing ring that may be tightened and/or augmented from a location outside of the tanker.

These together with additional objects, features and advantages of the improved float indication seal will be readily apparent to those of ordinary skill in the art upon reading the following detailed description of the presently preferred, but nonetheless illustrative, embodiments when taken in conjunction with the accompanying drawings.

In this respect, before explaining the current embodiments of the improved float indication seal in detail, it is to be understood that the improved float indication seal is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the improved float indication seal.

It is therefore important that the claims be regarded as including such equivalent construction insofar as they do not depart from the spirit and scope of the improved float indication seal. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 3 is an exploded view of an embodiment of the disclosure, illustrating the wall pass-through.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
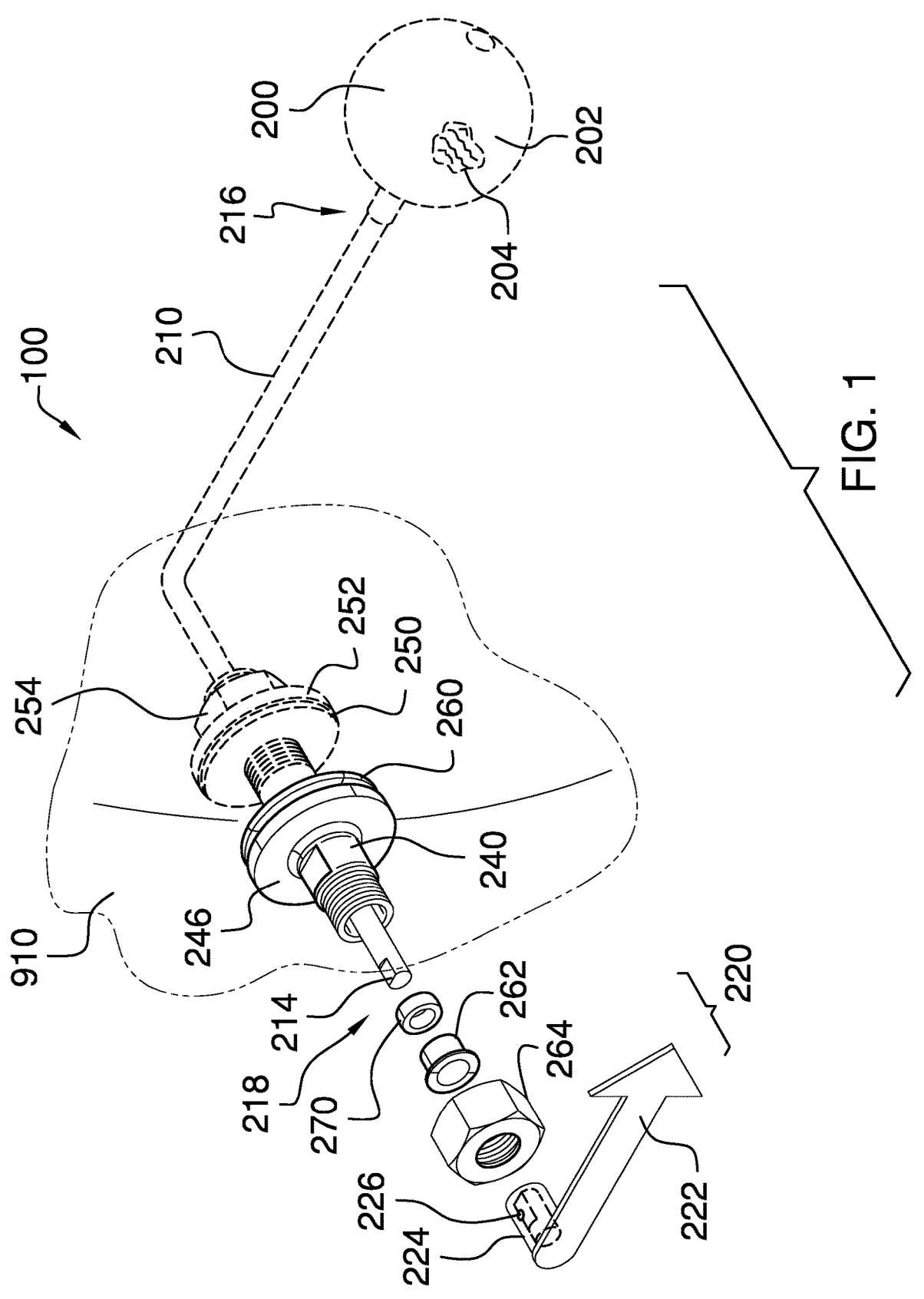
FIG. 1 is an isometric view of an embodiment of the disclosure.
Figure 2:
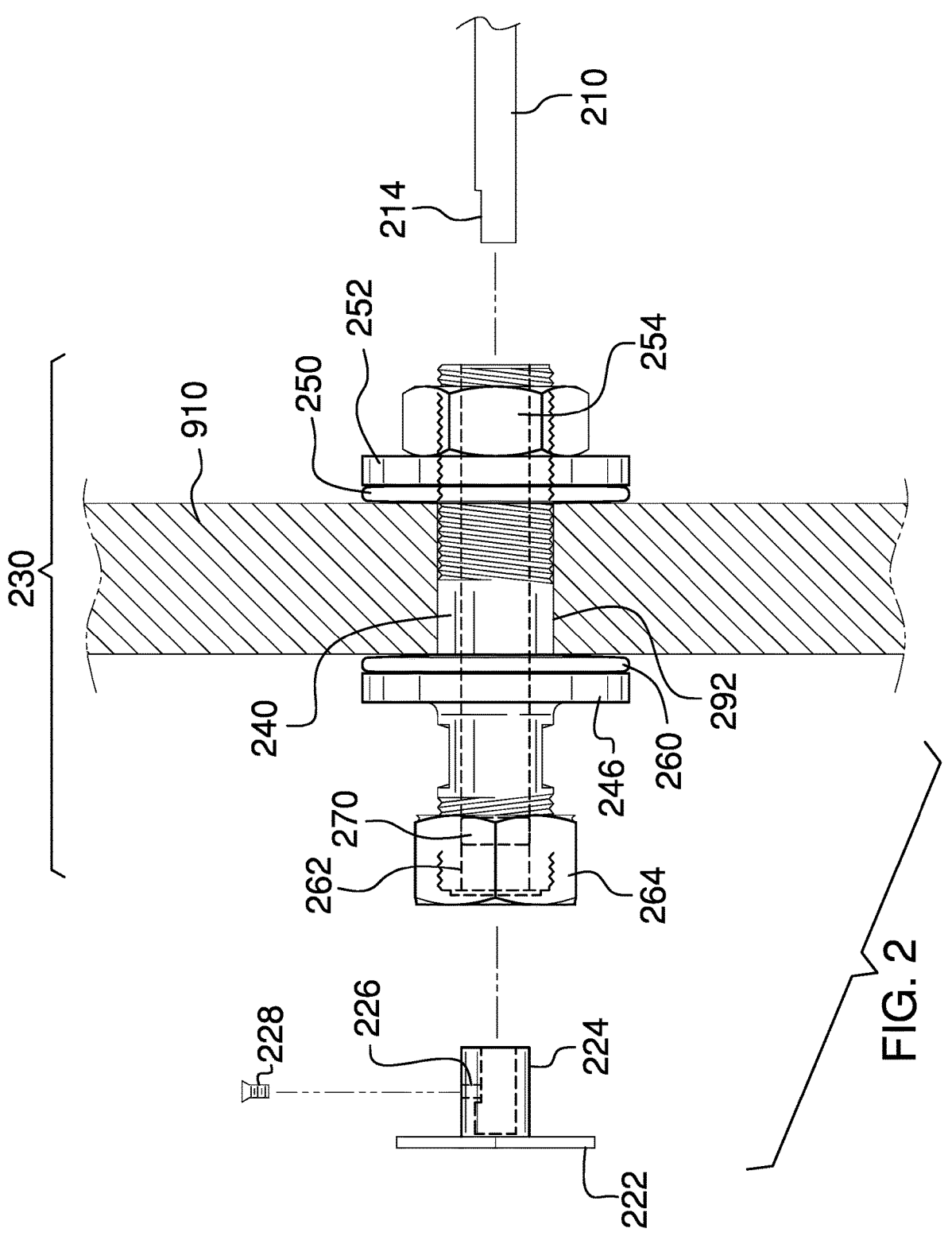
FIG. 2 is a side view of an embodiment of the disclosure.
Figure 3:
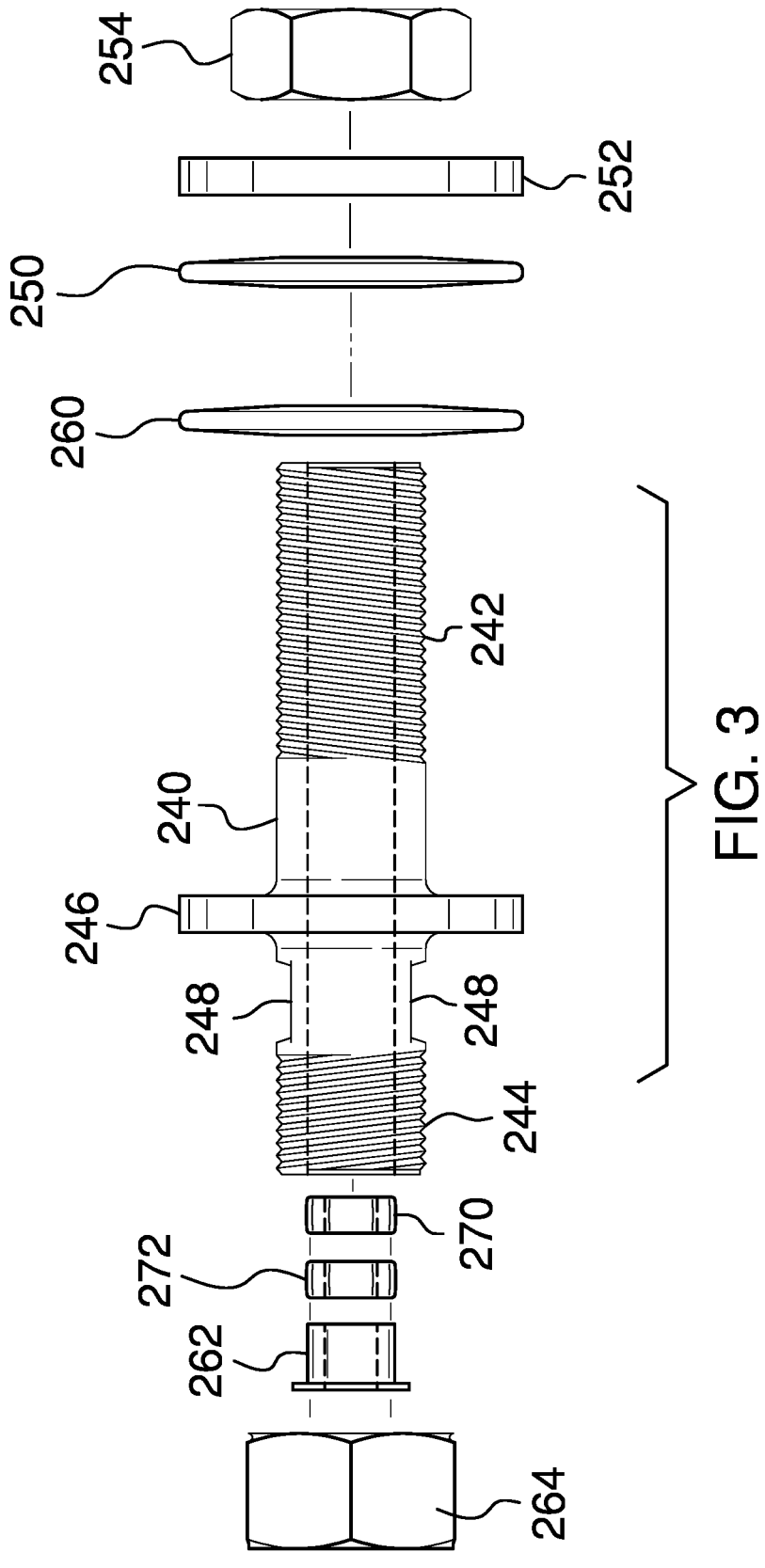
Figure 4:
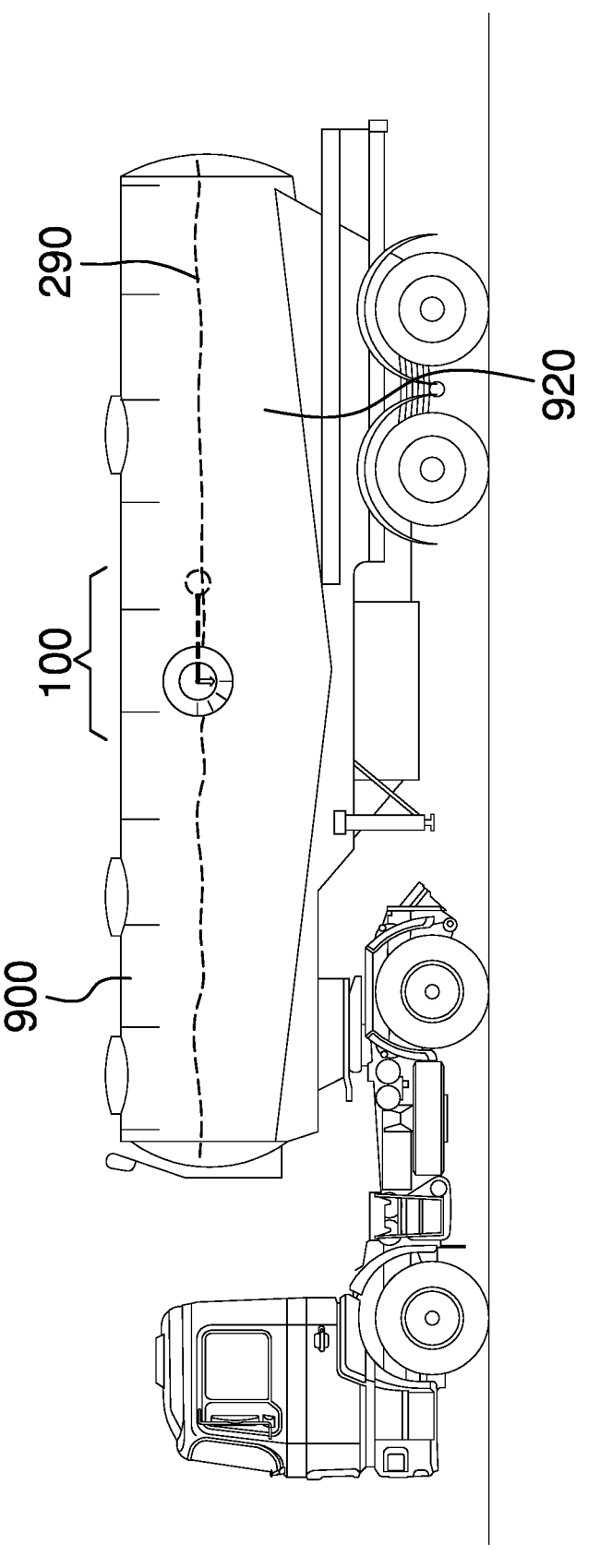
FIG. 4 is an in-use view of an embodiment of the disclosure.

Detailed reference will now be made to a first potential embodiment of the disclosure, which is illustrated in FIGS. 1 through 4.

The improved float indication seal 100 (hereinafter invention) comprises a float 200, a float rod 210, a level indicator 220, and a wall pass-through 230. The invention 100 may indicate a level 290 of a liquid 920 in a tanker 900. The float 200 may be located inside of the tanker 900 and may be buoyed by the liquid 920. The float rod 210 may couple the float 200 to the level indicator 220 located outside of the tanker 900 such that the level indicator 220 may move synchronously with the float 200 to indicate the level 290 of the liquid 920. The wall pass-through 230 comprising a packing ring 270 may pass the float rod 210 through a tanker wall 910. A leak at the wall pass-through 230 may be mitigated from outside of the tanker 900.

In some embodiments, the float 200 may comprise an outer cover 202 filled with a buoyant internal material 204. As non-limiting examples, the outer cover 202 may be made of high density polyethylene, metal, nitrile butadiene rubber, or any combination thereof and the buoyant internal material 204 may be air, polystyrene, balsa wood, cork, high density polyethylene, low density polyethylene, polypropylene, nitrile butadiene rubber, or any combination thereof.

The float 200 may couple to an interior end 216 of the float rod 210. The float rod 210 may be a bent armature. The float rod 210 may be oriented horizontally where the float rod 210 passes through the wall pass-through 230. Inside the tanker the float rod 210 may bend by 45 degrees to 90 degrees. In a preferred embodiment, the float rod 210 may bend by 90 degrees when the tanker wall 910 is a flat vertical plane. The float rod 210 may bend less than 90 degrees but at least 45 degrees when the tanker wall 910 is curved.

The level indicator 220 may comprise a pointer 222, a neck 224, and a set screw aperture 226. The pointer 222 may indicate the position of the float 200. As a non-limiting example, the pointer 222 may point to indicia on a scale or dial affixed to the side of the tanker 900, The indicia may correspond to the level 290 of the liquid 920 in the tanker 900. The neck 224 may couple to an exterior end 218 of the float rod 210 and may fix the direction of the pointer 222 to be perpendicular to the exterior end 218 of the float rod 210. The neck 224 may comprise the set screw aperture 226 such that the level indicator 220 May be coupled to the exterior end 218 of the float rod 210 and held in place by a set screw 228. The exterior end 218 of the float rod 210 may comprise a float rod D-cut 214 that the set screw 228 may press against to prevent the level indicator 220 from freely rotating on the exterior end 218 of the float rod 210. The float rod D-cut 214 may be positioned such that the angular position of the pointer 222 aligns with the angular position of the float 200. The pointer 222 may point straight up in a full tank. The pointer 222 may point straight down in an empty tank.

The wall pass-through 230 may comprise a nipple 240, an interior gasket 250, an interior flat washer 252, an interior retaining nut 254, an exterior gasket 260, the packing ring 270, a bushing 262, and an exterior retaining nut 264. The wall pass-through 230 may pass through a wall aperture 292 in the tanker 11 wall 910. The float rod 210 may traverse the center of the wall pass-through 230 such that the float 200 may control movement of the level indicator 220 via the float rod 210.

The nipple 240 may be a hollow pipe section that passes through the tanker wall 910. The nipple 240 may be open at both ends such that the float rod 210 may pass through the nipple 240. The nipple 240 may comprise a male thread on both ends. The nipple 240 may comprise a fixed flat washer 246 coupled to a midpoint of the nipple 240 and oriented to be parallel to longitudinal axis of the nipple 240. As a non-limiting example, the fixed flat washer 246 may be welded to the outside of the nipple 240.

The nipple 240 may be inserted into the wall aperture 292 from outside of the tanker 900 with the exterior gasket 260 sandwiched between the fixed flat washer 246 and the tanker wall 910. The fixed flat washer 246 may limit the insertion distance of the nipple 240. The interior gasket 250, the interior flat washer 252, and the interior retaining nut 254 may be inserted over the nipple 240 from within the tanker 900 with the interior gasket 250 sandwiched between the interior flat washer 252 and the tanker wall 910. The interior retaining nut 254 may be threaded onto an interior thread 242 of the nipple 240 and tightened to press the interior flat washer 252 and the interior gasket 250 against the tanker wall 910. The exterior gasket 260 and the interior gasket 250 may form a leak-proof seal around the nipple 240. The nipple 240 may comprise one or more nipple D-cuts 248 positioned outside of the tanker 900 to aid in tightening the interior retaining nut 254. As a non-limiting example, during installation a first installer located outside of the tanker 900 may place the exterior gasket 260 onto the nipple 240, insert the nipple 240 through the wall aperture 292, and hold a first wrench on the one or more nipple D-cuts 248. A second installer located inside of the tanker 900 may place the interior gasket 250, the interior flat washer 252, and the 23 interior retaining nut 254 onto the nipple 240 and may tighten the interior retaining nut 254 using a second wrench.

The float rod 210 may be positioned such that the float 200 is located within the tanker 900 and the exterior end 218 of the float rod 210 extends through the nipple 240 and is accessible outside of the tanker 900. The packing ring 270 may be placed over the exterior end 218 of the float rod 210 and pushed into the nipple 240. The bushing 262 may be placed over the exterior end 218 of the float rod 210 and pushed against the packing ring 270. The exterior retaining nut 264 may be placed over the exterior end 218 of the float rod 210 and threaded onto an exterior thread 244 of the nipple 240. The exterior retaining nut 264 may be a compression nut and may push the bushing 262 towards the tanker wall 910 as the exterior retaining nut 264 is tightened, forcing the packing ring 270 into the nipple 240. The packing ring 270 may form a seal between the float rod 210 and the inside wall of the nipple 240 and may prevent the liquid 920 from leaking from the tanker 900 via the nipple 240.

Should the leak develop at the nipple 240, the leak may be mitigated from the outside of the tanker 900 by tightening the exterior retaining nut 264 in order to force the bushing 262 and the packing ring 270 farther into the nipple 240, thus tightening the packing ring 270. Alternatively, the leak may be mitigated from the outside of the tanker 900 by removing the exterior retaining nut 264 and the bushing 262, placing one or more additional packing rings 272 over the float rod 210 and against the end of the nipple 240, replacing the bushing 262 and the exterior retaining nut 264, and tightening the exterior retaining nut 264 onto the exterior end 218 of the nipple 240.

In use, the invention 100 may be installed on a tanker wall 910 of a tanker 900.

A first installer located outside of the tanker 900 may place the exterior gasket 260 onto the nipple 240, insert the nipple 240 through a wall aperture 292, and hold a first wrench on the one or more nipple D-cuts 248. The fixed flat washer 246 may limit the insertion distance of the nipple 240. A second installer located inside of the tanker 900 may place the interior gasket 250, the interior flat washer 252, and the interior retaining nut 254 onto the nipple 240 and may tighten the interior retaining nut 254 using a second wrench. The exterior gasket 260 and the interior gasket 250 may form a leak-proof seal around the nipple 240.

The second installer may pass the exterior end 218 of the float rod 210 through the nipple 240 to the outside of the tanker 900. A packing ring 270 may be placed over the exterior end 218 of the float rod 210 and pushed into the nipple 240. The bushing 262 may be placed over the exterior end 218 of the float rod 210 and pushed against the packing ring 270. The exterior retaining nut 264 may be placed over the exterior end 218 of the float rod 210 and threaded onto the exterior thread 244 of the nipple 240. The exterior retaining nut 264 may be a compression nut and may push the bushing 262 towards the tanker wall 910 as the exterior retaining nut 264 is tightened, forcing the packing ring 270 into the nipple 240. The packing ring 270 may form a seal between the float rod 210 and the inside wall of the nipple 240 and may prevent a liquid 920 from leaking from the tanker via the nipple 240.

The second installer may exit from within the tanker 900 and the tanker 900 may be filled with the liquid 920. The float may be buoyed by the liquid 920 and may rise and fall with the level 290 of the liquid 920. The angular position of the float 200 may be conveyed to the pointer 222 via the float rod 210 such that the pointer 222 may indicate the level 290 of the liquid 920 within the tanker 900.

Leaks through the nipple 240 may be mitigated from the outside of the tanker 900 by tightening the exterior retaining nut 264 in order to force the bushing 262 and the packing ring 270 farther into the nipple 240 and/or by adding one or more additional packing rings 272.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "align" may refer to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" may be an opening in a surface or object. Aperture may be synonymous with hole, slit, crack, gap, slot, or opening.

As used in this disclosure, a "bushing" may be a cylindrical aperture through which an object is guided and potentially secured. Bushings are sometimes used as protective linings to reduce friction and to provide a leak-proof seal.

As used herein, "compression nut" may refer to a nut comprising an internal female thread that does not pass all the way through the nut, leaving a collar on one end of the nut. The internal diameter of the collar may be narrower than the internal diameter of the threading. As the compression nut is screwed onto the end of a hollow threaded pipe, the collar May push a sleeve, packing ring, or other seal into the pipe. As a non-limiting example, a compression nut may be use to join a pipe and a narrower tube where the tube passes through the compression nut and into the pipe. A seal may be pushed into 19 the pipe as the compression nut is tightened, thus preventing leaks between the tube and the pipe.

As used in this disclosure, the word "correspond" may indicate that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, a "gasket" may be an elastomeric material that is placed between a first surface and a second surface for the purpose of creating a liquid or gas impermeable seal between the first surface and the second surface or preventing the first surface from damaging the second surface (or vice versa).

As used in this disclosure, "horizontal" may be a directional term that refers to a direction that is perpendicular to the local force of gravity. Unless specifically noted in this disclosure, the horizontal direction is always perpendicular to the vertical direction.

As used in this disclosure, the term "indicia" may refer to one or more markings that identify a sentiment.

As used in this disclosure, the word "interior" may be used as a relational term that implies that an object is located or contained within the boundary of a structure or a space.

As used herein, the word "longitudinal" or "longitudinally" may refer to a lengthwise or longest direction or to a direction that is perpendicular to the lateral direction.

As used here, the word "midpoint" may refer to a point that is between the ends of an object. An "exact midpoint" may refer to a midpoint that is equidistant from edges of the object in at least one direction. Unless otherwise stated, a midpoint is not required to be at the exact center of the object but instead May be separated from the exact midpoint by up to 50% of the distance from the exact midpoint to the farthest edge, farthest end, or farthest corner.

As used herein, "nipple" may refer to a fitting comprising a short piece of pipe with at least one male thread. The nipple may comprise a male thread at each end of the pipe. The threads are not required to match in terms of handedness, form, angle, pitch, diameter, or thread depth.

As used herein, "packing" or "packing material" may refer to resilient or semi-resilient material that may be placed around a shaft or stem to create a seal. "Packing ring" may refer to packing material that is preformed into an annulus.

As used in this disclosure, a "scale" may refer to a system of ordered markings that are used as a reference for a measurement; the values associated with the ordered markings may be presented visually as indicia along a reference standard or as individual values on a digital readout.

As used in this disclosure, "vertical" may refer to a direction that is parallel to the local force of gravity. Unless specifically noted in this disclosure, the vertical direction is always perpendicular to horizontal.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An improved float indication seal comprising:
   a float, a float rod, a level indicator, and a wall passthrough;
   wherein the improved float indication seal indicates a level of a liquid in a tanker;
   wherein the float is located inside of the tanker and is buoyed by the liquid;
   wherein the float rod couples the float to the level indicator located outside of the tanker such that the level indicator moves synchronously with the float to indicate the level of the liquid;

wherein the wall pass-through comprising a packing ring passes the float rod through a tanker wall;

wherein a leak at the wall pass-through is mitigated from outside of the tanker;

wherein the float comprises an outer cover filled with a buoyant internal material;

wherein the float couples to an interior end of the float rod;

wherein the float rod is a bent armature;

wherein the float rod is oriented horizontally where the float rod passes through the wall pass-through;

wherein inside the tanker the float rod bends by 45 degrees to 90 degrees.

2. The improved float indication seal according to claim 1 wherein the outer cover is made of high density polyethylene, metal, nitrile butadiene rubber, or any combination thereof and the buoyant internal material is air, polystyrene, balsa wood, cork, high density polyethylene, low density polyethylene, polypropylene, nitrile butadiene rubber, or any combination thereof.

3. The improved float indication seal according to claim 2 wherein the float rod bends by 90 degrees when the tanker wall is a flat vertical plane.

4. The improved float indication seal according to claim 2 wherein the float rod bends less than 90 degrees but at least 45 degrees when the tanker wall is curved.

5. The improved float indication seal according to claim 2 wherein the level indicator comprises a pointer, a neck, and a set screw aperture;

wherein the pointer indicates the position of the float;

wherein the neck couples to an exterior end of the float rod and fixes the direction of the pointer to be perpendicular to the exterior end of the float rod;

wherein the neck comprises the set screw aperture such that the level indicator is coupled to the exterior end of the float rod and held in place by a set screw;

wherein the exterior end of the float rod comprises a float rod D-cut that the set screw presses against to prevent the level indicator from freely rotating on the exterior end of the float rod.

6. The improved float indication seal according to claim 5 wherein the float rod D-cut is positioned such that the angular position of the pointer aligns with the angular position of the float.

7. The improved float indication seal according to claim 6 wherein the pointer points straight up in a full tank;

wherein the pointer points straight down in an empty tank.

8. The improved float indication seal according to claim 6 wherein the wall pass-through comprises a nipple, an interior gasket, an interior flat washer, an interior retaining nut, an exterior gasket, the packing ring, a bushing, and an exterior retaining nut;

wherein the wall pass-through passes through a wall aperture in the tanker wall;

wherein the float rod traverses the center of the wall pass-through such that the float controls movement of the level indicator via the float rod.

9. The improved float indication seal according to claim 8 wherein the nipple is a hollow pipe section that passes through the tanker wall;

wherein the nipple is open at both ends such that the float rod passes through the nipple;

wherein the nipple comprises a male thread on both ends;

wherein the nipple comprises a fixed flat washer coupled to a midpoint of the nipple and oriented to be parallel to longitudinal axis of the nipple.

10. The improved float indication seal according to claim 9 wherein the nipple is inserted into the wall aperture from outside of the tanker with the exterior gasket sandwiched between the fixed flat washer and the tanker wall;

wherein the fixed flat washer limits the insertion distance of the nipple.

11. The improved float indication seal according to claim 10 wherein the interior gasket, the interior flat washer, and the interior retaining nut are inserted over the nipple from within the tanker with the interior gasket sandwiched between the interior flat washer and the tanker wall;

wherein the interior retaining nut is threaded onto an interior thread of the nipple and tightened to press the interior flat washer and the interior gasket against the tanker wall;

wherein the exterior gasket and the interior gasket form a leak-proof seal around the nipple.

12. The improved float indication seal according to claim 11 wherein the nipple comprises one or more nipple D-cuts positioned outside of the tanker to aid in tightening the interior retaining nut.

13. The improved float indication seal according to claim 12 wherein the float rod is positioned such that the float is located within the tanker and the exterior end of the float rod extends through the nipple and is accessible outside of the tanker;

wherein the packing ring is placed over the exterior end of the float rod and pushed into the nipple;

wherein the bushing is placed over the exterior end of the float rod and pushed against the packing ring;

wherein the exterior retaining nut is placed over the exterior end of the float rod and threaded onto an exterior thread of the nipple;

wherein the exterior retaining nut is a compression nut and pushes the bushing towards the tanker wall as the exterior retaining nut is tightened, forcing the packing ring into the nipple.

14. The improved float indication seal according to claim 13 wherein the packing ring forms a seal between the float rod and the inside wall of the nipple and prevents the liquid from leaking from the tanker via the nipple.

15. The improved float indication seal according to claim 14 wherein the leak is mitigated from the outside of the tanker by tightening the exterior retaining nut in order to force the bushing and the packing ring farther into the nipple, thus tightening the packing ring.

* * * * *